US012627331B2

(12) United States Patent
Maes et al.

(10) Patent No.: US 12,627,331 B2
(45) Date of Patent: May 12, 2026

(54) GAIN ADAPTATION FOR DOWNSTREAM VECTORING SYSTEMS

(71) Applicant: Alcatel Lucent, Nozay (FR)

(72) Inventors: Jochen Maes, Veerle (BE); Michael Timmers, Herent (BE); Dirk Vanderhaegen, Wemmel (BE); Carl Nuzman, Union, NJ (US); Danny Van Bruyssel, Bonheiden (BE)

(73) Assignee: Alcatel Lucent, Nozay (FR)

( * ) Notice: Subject to any disclaimer, the term of this patent is extended or adjusted under 35 U.S.C. 154(b) by 391 days.

(21) Appl. No.: 17/571,928

(22) Filed: Jan. 10, 2022

(65) Prior Publication Data

US 2022/0224375 A1      Jul. 14, 2022

Related U.S. Application Data

(63) Continuation of application No. 14/654,690, filed as application No. PCT/EP2014/050102 on Jan. 7, 2014, now Pat. No. 11,258,479.

(30) Foreign Application Priority Data

Jan. 11, 2013     (EP) ..................................... 13305023

(51) Int. Cl.
H04B 3/32            (2006.01)
(52) U.S. Cl.
CPC ..................................... H04B 3/32 (2013.01)
(58) Field of Classification Search
None
See application file for complete search history.

(56) References Cited

U.S. PATENT DOCUMENTS

| | | | |
|---|---|---|---|
| 7,027,500 B1 * | 4/2006 | Casas .................. H04L 25/0307 | |
| | | | 375/232 |
| 2005/0213405 A1 * | 9/2005 | Stopler ................ H04L 5/0044 | |
| | | | 365/203 |
| 2009/0060067 A1 | 3/2009 | Guenach et al. | |

(Continued)

FOREIGN PATENT DOCUMENTS

| | | |
|---|---|---|
| CN | 101645754 A | 2/2010 |
| CN | 102057627 A | 5/2011 |

(Continued)

OTHER PUBLICATIONS

International Search Report PCT/ISA/210 for International Application No. PCT/EP2014/050102 dated Feb. 12, 2014.

(Continued)

*Primary Examiner* — Adnan Baig
(74) *Attorney, Agent, or Firm* — Harness, Dickey & Pierce, P.L.C

(57) ABSTRACT

In accordance with an embodiment, the method includes detecting an update event whereupon a precoder needs to be updated, sending signal adjustment information to a receiver remotely coupled to a subscriber line out of the plurality of subscriber lines indicative of a signal compensation factor to be applied to a receive communication signal to compensate for a channel bias caused by the scheduled precoder update, and time-coordinating the precoder update with the enforcement of the signal compensation factor at the receiver.

19 Claims, 4 Drawing Sheets

(56) References Cited

U.S. PATENT DOCUMENTS

| | | | | |
|---|---|---|---|---|
| 2009/0073868 A1* | 3/2009 | Guenach | ............... | H04M 3/34 |
| | | | | 370/201 |
| 2009/0245081 A1 | 10/2009 | Ashikhmin et al. | | |
| 2009/0245335 A1 | 10/2009 | Fang | | |
| 2009/0285271 A1 | 11/2009 | Perez De Aranda Alonso et al. | | |
| 2010/0138631 A1* | 6/2010 | Gangalakurti | ........ | G06F 7/5446 |
| | | | | 712/7 |
| 2010/0232486 A1 | 9/2010 | Starr et al. | | |
| 2010/0329444 A1 | 12/2010 | Ashikhmin et al. | | |
| 2011/0007788 A1* | 1/2011 | Cendrillon | ............ | H04L 1/0026 |
| | | | | 375/222 |
| 2011/0038305 A1* | 2/2011 | Mella | ................. | H04W 52/286 |
| | | | | 370/328 |
| 2011/0200075 A1 | 8/2011 | Clevorn et al. | | |
| 2012/0257691 A1 | 10/2012 | Ginis et al. | | |
| 2013/0041600 A1* | 2/2013 | Rick | ....................... | G01F 1/002 |
| | | | | 702/50 |
| 2014/0064351 A1 | 3/2014 | Hidaka | | |
| 2015/0244418 A1 | 8/2015 | Verbin et al. | | |

FOREIGN PATENT DOCUMENTS

| | | | |
|---|---|---|---|
| CN | 102396160 | A | 3/2012 |
| CN | 102656813 | A | 9/2012 |
| JP | 2009189049 | A | 8/2009 |
| JP | 2010502129 | A | 1/2010 |
| JP | 2012500556 | A | 1/2012 |
| WO | WO-2011/084253 | A1 | 7/2011 |
| WO | WO-2012102917 | A1 | 8/2012 |
| WO | WO-2014054043 | A1 | 4/2014 |

OTHER PUBLICATIONS

Written Opinion of the International Searching Authority PCT/ISA/237 for International Application No. PCT/EP2014/050102 dated Feb. 12, 2014.

References were mentioned in a Third Party Observation for European Application No. 20130305023 dated Nov. 30, 2016.

Notice of Allowance dated Oct. 20, 2021, issued in corresponding U.S. Appl. No. 14/654,690.

* cited by examiner

GAIN ADAPTATION FOR DOWNSTREAM VECTORING SYSTEMS

CROSS-REFERENCE TO RELATED APPLICATIONS

This is a Continuation of, and claims priority under 35 U.S.C. § 120 to, U.S. application Ser. No. 14/654,690, filed Jun. 22, 2015, which is a National Phase of PCT/EP2014/050102, filed Jan. 7, 2014, which claims priority to EP 13305023.7 filed Jan. 11, 2013, the entire contents of each of which are hereby incorporated by reference.

TECHNICAL FIELD OF THE INVENTION

The present invention relates to a method and apparatus for controlling communications over a plurality of subscriber lines, the communications making use of communication signals that are jointly processed through a precoder for crosstalk pre-compensation.

TECHNICAL BACKGROUND OF THE INVENTION

Crosstalk (or inter-channel interference) is a major source of channel impairment for Multiple Input Multiple Output (MIMO) communication systems, such as Digital Subscriber Line (DSL) communication systems.

As the demand for higher data rates increases, DSL systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

A MIMO system can be described by the following linear model:

$$Y(k) = H(k)X(k) + Z(k), \quad (1)$$

wherein the N-component complex vector X, respectively Y, denotes a discrete frequency representation, as a function of the frequency/carrier/tone index k, of the symbols transmitted over, respectively received from, the N channels, wherein the N×N complex matrix H is referred to as the channel matrix: the (i,j)-th component of the channel matrix H describes how the communication system produces a signal on the i-th channel output in response to a signal being transmitted to the j-th channel input; the diagonal elements of the channel matrix describe direct channel coupling, and the off-diagonal elements of the channel matrix describe inter-channel coupling (also referred to as the crosstalk coefficients), and wherein the N-component complex vector Z denotes additive noise over the N channels, such as Radio Frequency Interference (RFI) or thermal noise.

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal precoding: the transmit data symbols are jointly passed through a precoder before being transmitted over the respective communication channels. The precoder is such that the concatenation of the precoder and the communication channel results in little or no inter-channel interference at the receiver. For instance, a linear precoder performs a matrix-product in the frequency domain of a transmit vector X(k) with a precoding matrix P(k), the precoding matrix P(k) being such that the resulting channel matrix H(k)P(k) is diagonalized, meaning the off-diagonal coefficients of the overall channel H(k)P(k)—and thus the inter-channel interference—mostly reduce to zero. Practically, the precoder superimposes anti-phase crosstalk pre-compensation signals over the victim line along with the direct signal that destructively interfere at the receiver with the actual crosstalk signals from the respective disturber lines.

A further technique for reducing inter-channel interference is joint signal post-processing: the receive data symbols are jointly passed through a postcoder before being detected. The postcoder is such that the concatenation of the communication channel and the postcoder results in little or no inter-channel interference at the receiver.

The choice of the vectoring group, that is to say the set of communication lines, the signals of which are jointly processed, is rather critical for achieving good crosstalk mitigation performances. Within a vectoring group, each communication line is considered as a disturber line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, local loop unbundling on account of national regulation policies and/or limited vectoring capabilities may prevent such an exhaustive approach, in which case the vectoring group would include a sub-set only of all the physically interacting lines, thereby yielding limited vectoring gains.

Signal vectoring is typically performed at a traffic aggregation point, whereat all the data symbols concurrently transmitted over, or received from, all the subscriber lines of the vectoring group are available. For instance, signal vectoring is advantageously performed within a Digital Subscriber Line Access Multiplexer (DSLAM) deployed at a Central office (co) or as a fiber-fed remote unit closer to subscriber premises (street cabinet, pole cabinet, etc). Signal precoding is particularly appropriate for downstream communication (toward customer premises), while signal post-processing is particularly appropriate for upstream communication (from customer premises).

Typically, the channel matrix is diagonally dominant, meaning the crosstalk gains are negligible compared to the direct channel gains. And so is the precoding matrix: the crosstalk pre-compensation signals that are superimposed over the victim line add little to the total transmit power.

With the advent of new access technology and the use of even broader transmit spectrum, this assumption may no longer hold true, meaning the crosstalk gains start being significant compared to the direct channel gains, and the channel matrix and the resulting precoding matrix are no longer diagonally dominant. If so, the superimposition of crosstalk pre-compensation signals over the victim line may violate the transmit Power Spectral Density (PSD) mask applicable to that victim line. One or more communication signals need to be scaled down before the precoding step to counter-balance this excessive signal power.

Also, the crosstalk pre-compensation signal that is superimposed over a victim line for mitigating the crosstalk from a given disturber line couples back into that disturber line and contributes to the desired or meaningful signal ($2^{nd}$ order effect). When the precoder is updated, one or more receivers may get out of track on account of the channel equalization bias induced by the newly superimposed cross-talk pre-compensation signals. Indeed, a receiver in tracking mode is unable to cope with a sudden change in direct channel gain as channel tracking typically requires hundreds of samples to converge and to achieve the required accuracy. Consequently, the signal is no longer correctly detected as the constellation points move away from their current expected position, thereby causing decoding errors that ultimately translate into line retrains and/or poor user experience.

SUMMARY OF THE INVENTION

It is an object of the present invention to improve robustness and performances of vectoring systems in case of non-diagonally dominant channel matrix.

In accordance with a first aspect of the invention, a method for controlling communications over a plurality of subscriber lines is proposed. The communications make use of communication signals that are jointly processed through a precoder for crosstalk pre-compensation. The method comprises detecting an update event whereupon the precoder needs to be updated, sending signal adjustment information to a receiver remotely coupled to a subscriber line out of the plurality of subscriber lines indicative of a signal compensation factor to be applied to a receive communication signal to compensate for a channel bias caused by the scheduled precoder update, and time-coordinating the precoder update with the enforcement of the signal compensation factor at the receiver.

In one embodiment of the invention, the precoder update comprises determining a signal scaling factor to be applied to a transmit communication signal for conformance to a transmit PSD mask over the subscriber line, and the signal compensation factor compensates for a first channel bias caused by a corresponding transmit signal scaling.

In one embodiment of the invention, the precoder update comprises determining one or more coupling coefficients of the precoder for mitigating crosstalk from the subscriber line into one or more victim lines, and the signal compensation factor further compensates for a second channel bias caused by corresponding crosstalk pre-compensation signals superimposed over the one or more victim lines.

In one embodiment of the invention, the signal compensation factor is a scalar factor that compensates for a channel amplitude bias.

In one embodiment of the invention, the signal compensation factor is a complex factor that compensates for both a channel amplitude bias and a channel phase bias.

In one embodiment of the invention, the sending step and the corresponding signal adjustment at the receiver is conditioned to the amount of channel bias caused by the scheduled precoder update.

In one embodiment of the invention, the precoder is updated in two steps, a first precoder update with partial precoding gains and limited channel bias, and a second precoder update with full precoding gains. The sending step takes place between the first and second precoder updates, and the second precoder update is time-coordinated with the enforcement of the signal compensation factor at the receiver.

In one embodiment of the invention, the update event is a new subscriber line joining or leaving the plurality of subscriber lines.

In one embodiment of the invention, the update event is a substantial change in transmit power over a reconfigured subscriber line.

In one embodiment of the invention, the method further comprises the step of, upon receipt of the gain adjustment information, returning an adapted bit loading value and/or an adapted fine gain tuning factor for a respective carrier to a corresponding transmitter.

In one embodiment of the invention, the communication signals are multi-carrier signals, and the gain adjustment information and the corresponding signal compensation factor are determined on a per carrier basis.

In one embodiment of the invention, the amplitude of the signal scaling factor is based on a multi-user fairness criterion.

In accordance with another aspect of the invention, a first communication controller for controlling communications over a plurality of subscriber lines is proposed. The communications make use of communication signals that are jointly processed through a precoder for crosstalk pre-compensation. The first communication controller is configured to detect an update event whereupon the precoder needs to be updated, to send signal adjustment information to a receiver remotely coupled to a subscriber line out of the plurality of subscriber lines indicative of a signal compensation factor to be applied to a receive communication signal to compensate for a channel bias caused by the scheduled precoder update, and to time-coordinate the precoder update with the enforcement of the signal compensation factor at the receiver.

The first communication controller may form part of an access node, such as a DSLAM, an Ethernet switch, an edge router, etc.

Embodiments of a first communication controller according to the invention correspond with the respective embodiments of a method according to the invention.

In accordance with still another aspect of the invention, a second communication controller for controlling a communication over a subscriber line out of a plurality of subscriber lines is proposed. The communications over the plurality of subscriber lines make use of communication signals that are jointly processed through a precoder for crosstalk pre-compensation. The second communication controller is configured to receive signal adjustment information from a transmitter remotely coupled to the subscriber line indicative of a signal compensation factor to be applied to a receive communication signal to compensate for a channel bias caused by a scheduled precoder update, and to enforce the signal compensation factor.

The second communication controller may form part of a subscriber device that supports wired communication over an access plant, such as a desktop, a laptop, a modem, a network gateway, a media gateway, etc.

Embodiments of a second communication controller according to the invention correspond with the respective embodiments of a method according to the invention.

When the precoder needs to be updated, for instance on account of a new subscriber line joining a vectoring group and corresponding crosstalk pre-compensation signals being superimposed over the respective victim lines, or still for instance on account of appropriate signal scalings that need to be applied to one or more communication signals in order to constrain the transmit PSDs over one or more subscriber lines within the applicable transmit PSD mask, and when that precoder update is expected to cause a substantial channel equalization bias at one or more receivers, then a transmitter-controlled gain adaptation is proposed. Signal adjustment information are sent to the respective receivers, and the receivers derive signal compensation factors to compensate for the induced channel bias. The precoder update is then time-coordinated with the enforcement of the signal compensation factors at the receivers. This extra-level of coordination allows an effective and transparent update of the precoder without receivers being out of track, and irrespective of the crosstalk strengths incurred within the access plant.

The proposed transmitter-controlled signal adaptation comes on top of existing receiver-controlled gain adaptations, such as fine gain tuning to remove the excess noise margin (e.g., the so-called gi coefficients in DSL standards), as well as existing transmitter-controlled signal scalings prior to channel equalization, such as PSD shaping (e.g., the so-called tssi coefficients in DSL standards).

The signal compensation factors may compensate for both the amplitude bias and the phase bias caused by the scheduled precoder update, or may compensate for the amplitude bias only.

The procedure may be conditioned to the amount of channel equalization bias that is expected to be induced at the receiver on account of the precoder update. For instance, one may compare an expected strength—being an expected amplitude, power or energy—of the useful signal component at a receiver after the precoder update on one side, taking due account of the aforementioned 2nd order effect (meaning accounting for the direct and indirect channel gains), with the current strength of the signal component at the receiver upon which the current channel equalization coefficients are based on the other side. If these two quantities differ by a given margin, then an appropriate signal compensation factor needs to be applied at the receiver together with the precoder update. The selected margin typically depends on the amount of incurred noise at the receiver: the stronger the noise, the further away the constellation points, the higher the selected margin.

As a direct consequence of the signal gain adjustment, the receiver may return adjusted bit loading values and/or adjusted fine gain tuning factors for the respective carriers to the transmitter.

As a possible improvement, the precoder can be updated in two steps: a first precoder update with partial precoding gains yet that causes little channel equalization bias at the receivers and thus that does not require signal adjustment at the receivers, and a second final precoder update with full precoding gains along with appropriate signal adjustment at one or more receivers. By so doing, partial crosstalk mitigation can start at once without waiting for the gain adjustment procedure to complete.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

6

Figure 3:
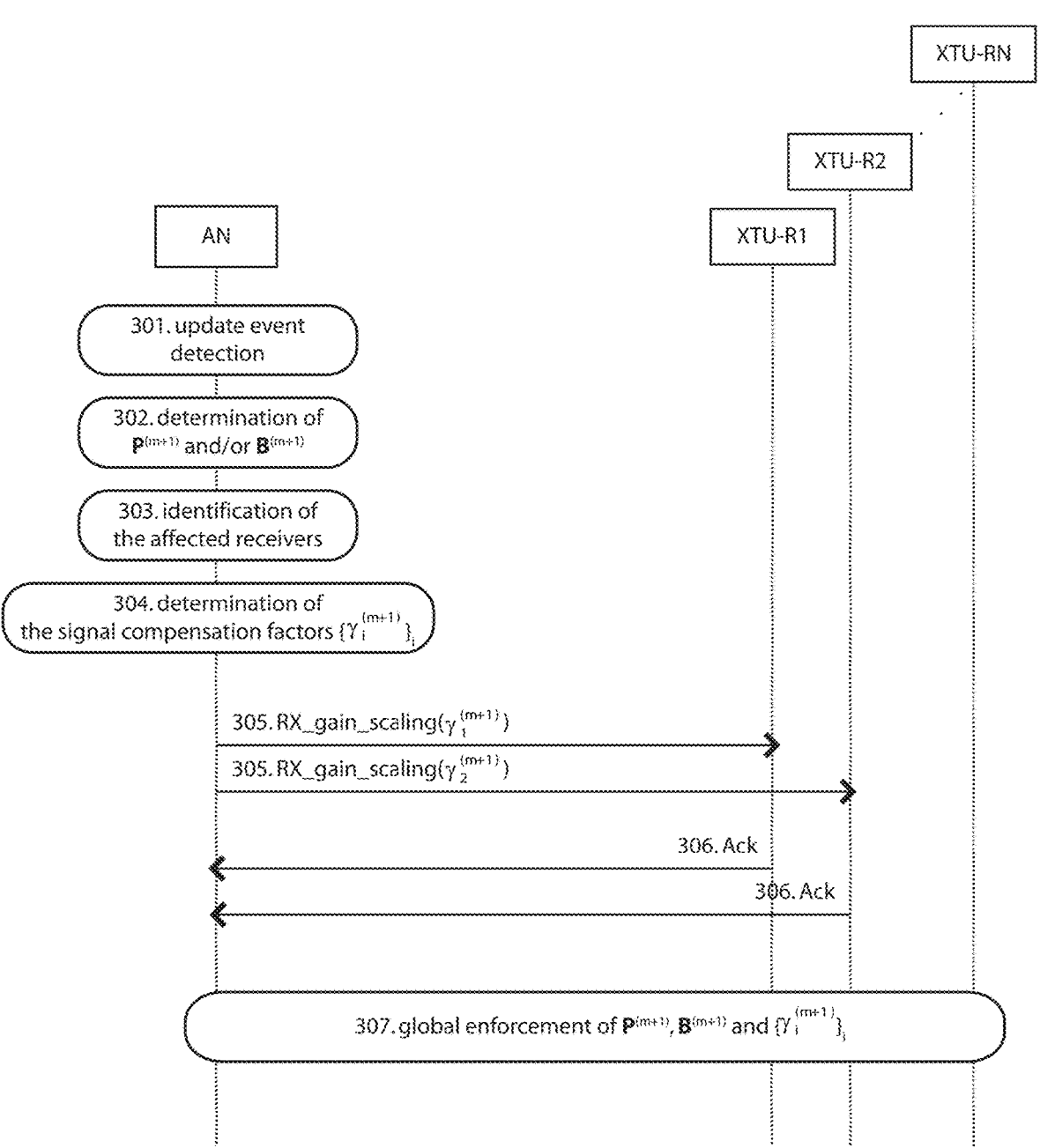
Figure 4:
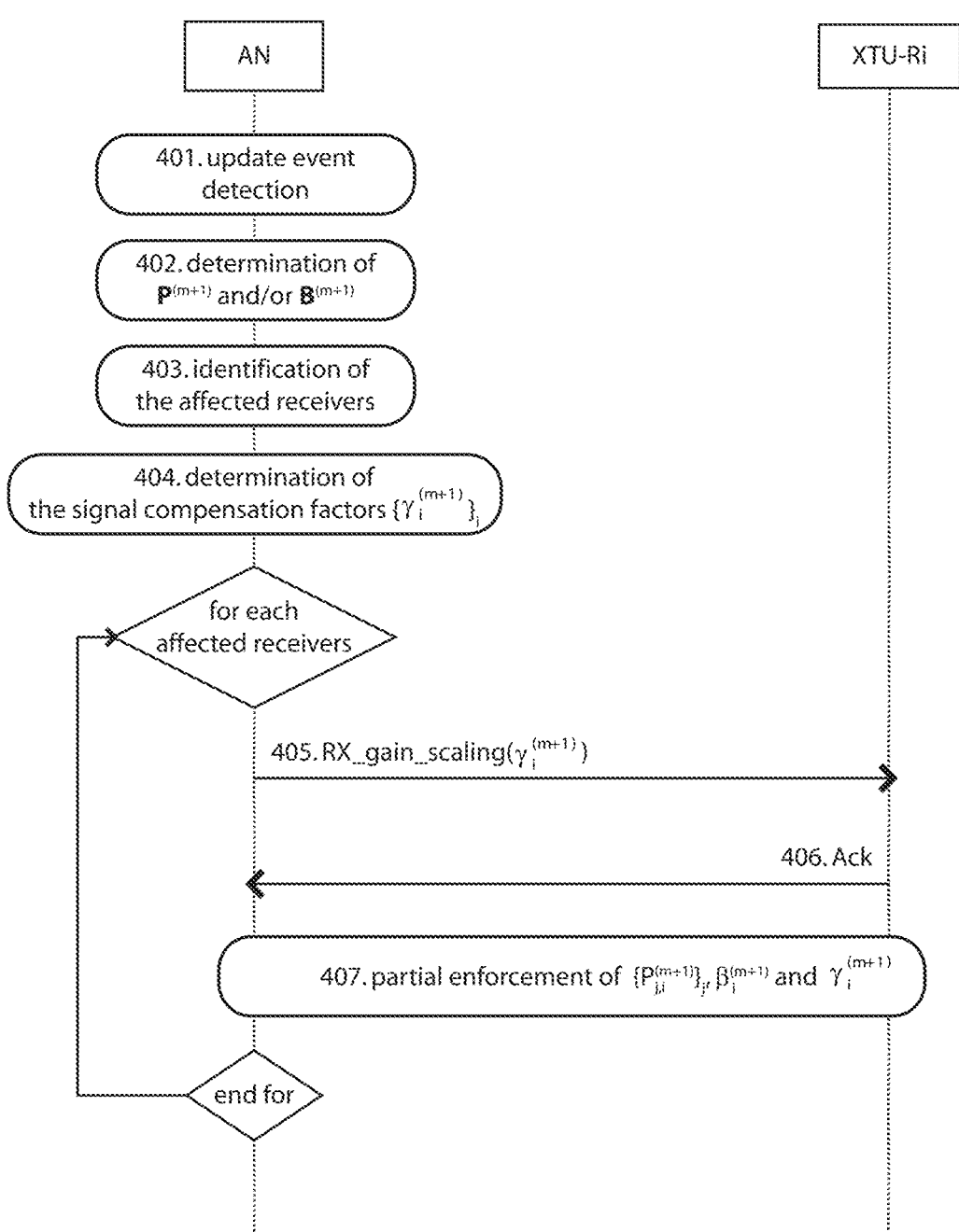

FIG. 3 represents a message flow chart between an access node and remote subscriber devices during a precoder update; and FIG. 4 represents an alternative message flow chart during the precoder update.

DETAILED DESCRIPTION OF THE INVENTION

Figure 1:
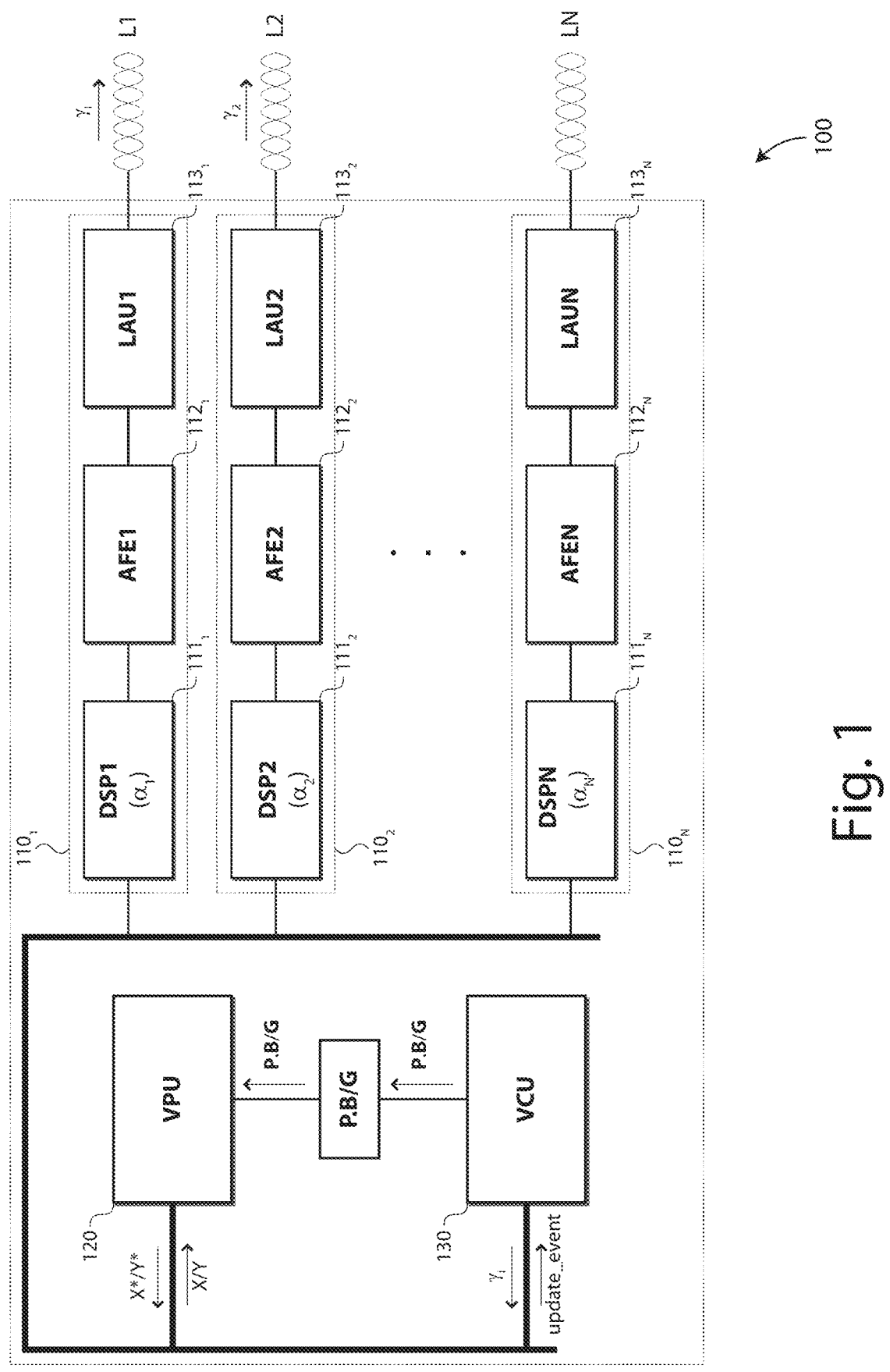
FIG. 1 represents an access node as per the present invention.

There is seen in FIG. 1 an access node 100 as per the present invention comprising the following functional blocks:

N transceivers 110;

a Vectoring Processing Unit 120 (or VPU); and a Vectoring Control Unit 130 (or VCU) for controlling the operation of the VPU 120.

The transceivers 110 are respectively coupled to the subscriber lines L1 to LN, which are assumed to form part of the same vectoring group. The transceivers 110 are also individually coupled to the VPU 120 and to the VCU 130. The VCU 130 is further coupled to the VPU 120.

Each one of the transceivers 110 comprises:

a Digital Signal Processor (DSP) 111;

an Analog Front End (AFE) 112; and a Line Adaptation Unit (LAU) 113.

The N DSPs 111 are coupled to respective ones of the N AFE units 112. The N AFEs 112 are further coupled to respective ones of the N LAUs 113. The N LAUs 113 are further coupled to respective ones of the N subscriber lines L1 to LN.

Each one of the AFEs 112 comprises a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

Each one of the LAUs 113 comprises a hybrid for coupling the transmitter output to the transmission line and the transmission line to the receiver input while achieving low transmitter-receiver coupling ratio (e.g., by means of echo cancellation techniques), further transmit and receive high-pass filters for filtering out any unwanted signals present in the POTS or ISDN frequency bands, impedance-matching circuitry for adapting to the characteristic impedance of the transmission line, and isolation circuitry (typically a transformer).

Each one of the DSPs 111 is arranged to operate downstream and upstream multi-carrier communication channels.

Each one of the DSPs 111 is further configured to operate downstream and upstream control channels that are used to transport control traffic between peer transceivers, such as diagnosis or management commands and responses. Control traffic is multiplexed with user traffic over the DSL channel.

More specifically, each one of the DSPs 111 is for encoding and modulating user and control data into digital data symbols, and for de-modulating and decoding user and control data from digital data symbols.

The following transmit steps are typically performed within the DSPs 111:

data encoding, such as data multiplexing, framing, scrambling, error correction encoding and interleaving;

signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding;

signal scaling;

Inverse Fast Fourier Transform (IFFT);

Cyclic Prefix (CP) insertion; and possibly time-windowing.

The following receive steps are typically performed within the DSPs 111:

CP removal, and possibly time-windowing;

Fast Fourier Transform (FFT);

Frequency EQualization (FEQ);

signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with Trellis decoding, and re-ordering all the detected chunks of bits according to the carrier ordering table; and data decoding, such as data de-interleaving, RS decoding (byte errors, if any, are corrected at this stage), de-scrambling, frame delineation and de-multiplexing.

Each one of the DSPs 111 is further configured to supply transmit frequency samples to the VPU 120 before Inverse Fast Fourier Transform (IFFT) step for joint signal precoding, and to supply receive frequency samples to the VPU 120 after Fast Fourier Transform (FFT) step for joint signal post-processing.

Each one of the DSPs 111 is further configured to receive corrected frequency samples from the VPU 120 for further transmission or detection. Alternatively, the DSPs 111 may receive correction samples to add to the initial frequency samples before further transmission or detection.

Each one of the DSPs 111 is further configured to notify the VCU 130 about particular events (see "update_event" in FIG. 1), such as the detection of a new initializing line, or when the transmit power is significantly adjusted over a given subscriber line.

The VPU 120 is configured to mitigate the crosstalk induced over the transmission lines L1 to LN. This is achieved by multiplying a vector X of transmit frequency samples with a precoding matrix P so as to pre-compensate with an estimate of the expected crosstalk (downstream), or by multiplying a vector Y of receive frequency samples with a crosstalk cancellation matrix G so as to post-compensate with an estimate of the incurred crosstalk (upstream).

Let i and j denote line indexes ranging from 1 to N, k a frequency index, and 1 a data symbol index. In case of Frequency Division Duplexing (FDD) transmission, the frequency index k takes on different and non-overlapping range values depending on whether downstream or upstream communication is considered. In case of Time Division Duplexing (TDD) transmission, the frequency index k may take on common range values for both downstream and upstream communications.

Let $$x_i^l(k)$$

and $$x*_i^l(k)$$

denote the transmit downstream frequency samples transmitted over line Li during data symbol 1 before and after crosstalk pre-compensation by the VPU 121 respectively, and let $X^l(k)$ and $X*^l(k)$ denote the respective transmit vectors before and after crosstalk pre-compensation.

Similarly, let $$Y_i^l(k)$$

and $$Y*_i^l(k)$$

denote the receive upstream frequency samples received from line Li during data symbol l before and after crosstalk cancellation respectively, and let $Y^l(k)$ and $Y*^l(k)$ denote the respective receive vectors before and after crosstalk pre-compensation.

We have:

$$X*^l(k)=P(k)\cdot X^l(k) \text{ or equivalently}$$

$$
\begin{bmatrix} X*_1^l(k) \\ X*_2^l(k) \\ \vdots \\ X*_N^l(k) \end{bmatrix} = \begin{bmatrix} P_{1,1}(k) & P_{1,2}(k) & \ldots & P_{1,N}(k) \\ P_{2,1}(k) & P_{2,2}(k) & & \vdots \\ \vdots & & & P_{N-1,N}(k) \\ P_{N,1}(k) & \ldots & P_{N,N-1}(k) & P_{N,N}(k) \end{bmatrix} \cdot \begin{bmatrix} X_1^l(k) \\ X_2^l(k) \\ \vdots \\ X_N^l(k) \end{bmatrix}, \quad (2)
$$

and $$Y*^l(k)=G(k)\cdot Y^l(k) \text{ or equivalently}$$

$$
\begin{bmatrix} Y*_1^l(k) \\ Y*_2^l(k) \\ \vdots \\ Y*_N^l(k) \end{bmatrix} = \begin{bmatrix} G_{1,1}(k) & G_{1,2}(k) & \ldots & G_{1,N}(k) \\ G_{2,1}(k) & G_{2,2}(k) & & \vdots \\ \vdots & & & G_{N-1,N}(k) \\ G_{N,1}(k) & \ldots & G_{N,N-1}(k) & G_{N,N}(k) \end{bmatrix} \cdot \begin{bmatrix} Y_1^l(k) \\ Y_2^l(k) \\ \vdots \\ Y_N^l(k) \end{bmatrix}, \quad (3)
$$

In the matrix P or G, a row i represents a particular victim line Li, while a column j represents a particular disturber line Lj. At the intersection, the coupling coefficient that should be applied to the corresponding disturber transmit or receive frequency sample for mitigating over the victim line Li the crosstalk from the disturber line Lj. Not all the coefficients of the matrix need to be determined, for instance on account of limited vectoring capabilities first assigned to the strongest crosstalkers, or still for instance due to the fact that some lines do not noticeably interact with each other. The undetermined coefficients are preferably set to 0.

Also, it is noteworthy that a communication line for which vectoring operation is not supported or not enabled, such as a legacy line, yet that still noticeably interferes with other communication lines, is only considered as a disturber line within the vectoring group. The off-diagonal coefficients of the corresponding row of the matrix P or G are thus all set to 0.

The VCU 130 is basically for controlling the operation of the VPU 120, and more specifically for estimating or updating the crosstalk coefficients between the subscriber lines L1 to LN, and for initializing or updating the precoding matrix P and the crosstalk cancellation matrix G from the so-estimated crosstalk coefficients.

The VCU 130 starts first by configuring the respective downstream and upstream pilot sequences to be used over the lines L1 to LN. The pilot digit transmitted over line Li at frequency index k during a given symbol period 1 is denoted as $$W_i^1(k).$$

The pilot sequence comprises L pilot digits $$\{W_i^1(k)\}_1$$

to be transmitted over L symbol periods. The pilot sequences are mutually orthogonal.

The VCU 130 gathers respective slicer errors as measured during the detection of the pilot digits by the remote receivers for downstream communication, and by the DSPs 111 for upstream communication. The equalized interference measurement carried out over a victim line Li at frequency index k during symbol period 1 is denoted as $$\varepsilon_i^1(k).$$

Next, the VCU 130 correlates the interference measurements $$\{\varepsilon_i^1(k)\}_1$$

as measured over the victim line Li with the respective pilot digits $$\{W_j^1(k)\}_1$$

transmitted over the disturber line Lj to get an estimate of the equalized crosstalk coefficients from line Lj into line Li at frequency index k. As the pilot sequences are mutually orthogonal, the contributions from the other disturber lines reduce to zero after this correlation step.

The VCU 130 can now proceed with the computation of the precoding matrix P and the crosstalk cancellation matrix G from the so-determined crosstalk coefficients. The VCU 130 can use a first-order matrix inversion to compute the coefficients of the precoding matrix P and the crosstalk cancellation matrix G, or any other suitable method.

Let the channel matrix H be written as:

$$H(k) = D(k) \cdot C(k), \tag{4}$$

wherein D(k) denotes a diagonal matrix comprising the direct channel gains $D_{i,i}(k)=H_{i,i}(k)$ as diagonal elements, and zero coefficients $D_{i,j}(k)=0$ as off-diagonal elements (i≠j), and wherein C(k) denotes a matrix comprising the equalized crosstalk coefficients $c_{i,j}(k)=H_{i,j}(k)/H_{i,i}(k)$ as off-diagonal elements (i≠j), and thus unity coefficients $C_{i,i}(k)=1$ as diagonal elements.

Ideally, P shall converge towards $C^{-1}$ such that:

$$Y = D^{-1} \cdot D \cdot C \cdot C^{-1} \cdot X + D^{-1} \cdot N = X + D^{-1} \cdot Z, \tag{5}$$

wherein $D^{-1}$ stands for the FEQ coefficients that are applied at the respective receivers to compensate for the direct channel gain.

Practically, the precoder uses an estimate $\hat{C}$ that approximates the actual C and $P=\hat{C}^{-1}$. Similarly, the receivers use an estimate $\hat{D}$ that approximates the actual D. Thus we have:

$$Y = \hat{D}^{-1} \cdot D \cdot C \cdot \hat{C}^{-1} \cdot X + \hat{D}^{-1} \cdot N - X + \hat{D}^{-1} \cdot Z. \tag{6}$$

Let A(k) denote a fine gain tuning matrix comprising fine gain tuning factors $A_{i,i}(k)=\alpha_i(k)$ as diagonal elements, and zero coefficients $A_{i,j}(k)=0$ as off-diagonal elements (i≠j).

The fine gain tuning factors $\alpha_i(k)$ are positive scalar factors that are determined by the respective receivers. The fine gain tuning factors $\alpha_i(k)$ are applied to the respective transmit frequency samples before precoding.

The receivers have to compensate for the respective signal scalings at the transmit side. As the receivers have the exact knowledge of the fine gain tuning factors $\alpha_i(k)$ that are in force at the transmit side, they can derive appropriate fine gain tuning compensation factors, namely $\alpha_i(k)^{-1}$.

Similarly, let B(k) denote a signal scaling matrix comprising signal scaling factors $B_{i,i}(k)=\beta_i(k)$ as diagonal elements, and zero coefficients $B_{i,j}(k)=0$ as off-diagonal elements (i≠j).

The signal scaling factors $\beta_i(k)$ are real or complex factors that are determined by the VCU 130 for conformance to a transmit PSD mask (different transmit PSD masks may apply to respective subscriber lines according to their respective transmit profile), and in accordance with the observed respective crosstalk couplings. The signal scaling factors $\beta_i(k)$ are applied to the respective transmit frequency samples before precoding.

The signal scaling factors $\beta_i(k)$ shall be such that the following transmit power constraint is conformed to:

$$TXP_i(k) = E\left\{ \left| \sum_{j=1}^{N} P_{i,j}(k) \cdot \beta_j(k) \cdot \alpha_j(k) \cdot X_j(k) \right|^2 \right\} = \tag{7}$$

$$\sum_{j=1}^{N} |P_{i,j}(k) \cdot \beta_j(k) \cdot \alpha_j(k)|^2 \cdot \sigma_j^2(k) \le TXM_i(k),$$

wherein E{.} denotes the expectation operator,
wherein $TXP_i$ denotes the average transmit power over the subscriber line Li, including the contributions for the direct signal $X_i$ and for the crosstalk pre-compensation signals $X_j$, j≠i,
wherein $TXM_i$ denotes a transmit PSD mask applicable to the subscriber line Li,
and wherein $\sigma_i^2=E\{X_i^2\}$ denotes the average transmit power of the communication signal $X_i$.

The magnitude of the signal scaling factors $\beta_i(k)$ are determined based on a fairness criterion amongst the respective subscriber lines, possibly including further criteria such as a Service Level Agreement (SLA) to comply with or a Quality of Service (QoS) to guarantee for a given subscriber line.

One such fairness criterion obtains equal relative transmit power for each communication signal $X_i$ at the output of the precoder. The relative transmit power at the output of the precoder is proportional to $$\sum_{j=1}^{N} |P_{j,i} \cdot \beta_i|^2 = |\beta_i|^2 \cdot \sum_{j=1}^{N} |P_{j,i}|^2.$$

It is relative to any other gain scaling that may be line dependent, such as the configured PSD shaping and the fine gain tuning.

Let $\Gamma(k)$ denote a signal compensation matrix comprising signal compensation factors $\Gamma_{i,i}(k)=\gamma_i(k)$ as diagonal elements, and zero coefficients $\Gamma_{i,j}(k)=0$ as off-diagonal elements ($i \neq j$).

The signal compensation factors $\gamma_i(k)$ are real or complex factors that are determined by the VCU 130 to compensate for the channel bias induced at the respective receivers by the update of the precoding matrix P and/or the update of the signal scaling matrix B. The signal compensation factors $\gamma_i(k)$ are to be applied to the respective receive frequency samples.

Finally, let $E(k)$ denote a signal equalization matrix used by the receivers to equalize the respective communication channels, and comprising the FEQ coefficients actually used by the respective receivers as diagonal elements, and zero coefficients as off-diagonal elements.
Thus we have:

$$Y = A^{-1} \cdot \Gamma \cdot E \cdot D \cdot C \cdot P \cdot B \cdot A \cdot X + A^{-1} \cdot \Gamma \cdot E \cdot Z. \tag{8}$$

Equation (8) does not imply a particular architectural choice. As diagonal matrices are commutable between each other, one can apply the respective scaling coefficients in whichever order. For instance, The scaling coefficients $\beta_i(k)$ can be applied upfront by the respective DSPs 111, or alternatively the signal scaling matrix B can be merged with the precoding matrix P into one single matrix. In the latter case, the signal scalings correspond to one or more column-wise updates of the precoding matrix. Still for instance, channel equalization can be performed after appropriate signal compensation $A^{-1} \cdot \Gamma$ at the receivers, thereby allowing the equalizers to track and to compensate for estimate errors in (8). Still for instance, the matrix product $A^{-1} \cdot \Gamma \cdot E$ can be merged into one single diagonal matrix comprising single equalization coefficients for the respective receivers.

Let us now introduce a precoder iteration index m, and let us assume that the receivers have properly equalized their respective communication channels after the $m^{th}$ precoder update.

The equalized noise-free receive signal component, taking duly account of the direct and indirect channel gains, is given by:

$$\hat{X}_i = \sum_{j=1}^{N} \alpha_i^{-1} \cdot \gamma_i^{(m)} \cdot E_{i,i} \cdot H_{i,j} \cdot P_{j,i}^{(m)} \cdot \beta_i^{(m)} \cdot \alpha_i \cdot X_i = \tag{9}$$

-continued $$\gamma_i^{(m)} \cdot \beta_i^{(m)} \cdot E_{i,i} \cdot \left( \sum_{j=1}^{N} H_{i,j} \cdot P_{j,i}^{(m)} \right) \cdot X_i.$$

If the receive signal $Y_i$ is correctly equalized after iteration m, then equation (9) is expected to converge towards $X_i$. Typically, $E_{i,i}$ compensates for the term $$\left( \sum_{j=1}^{N} H_{i,j} \cdot P_{j,i}^{(m)} \right),$$

thereby yielding $$\gamma_i^{(m)} = \frac{1}{\beta_i^{(m)}}.$$

Let us further assume that the channel matrix H does not vary between the precoder updates m and m+1, and neither do the fine gain tuning factors $\alpha_i$ and the FEQ coefficients $E_{i,i}$.

The new signal compensation factors $$\gamma_i^{(m+1)}$$

that need to be applied at the respective receivers to compensate for the precoder update, being the update of the precoding matrix P when a new line joins the vectoring group ($P^{(m)} \rightarrow P^{(m+1)}$) and/or the update of the signal scaling matrix B for conformance to a transmit PSD mask ($B^{(m)} \rightarrow B^{(m+1)}$), are given by:

$$\gamma_i^{(m+1)} = \frac{\beta_i^{(m)} \cdot \left( \sum_{j=1}^{N} H_{i,j} \cdot P_{j,i}^{(m)} \right)}{\beta_i^{(m+1)} \cdot \left( \sum_{j=1}^{N} H_{i,j} \cdot P_{j,i}^{(m+1)} \right)} \cdot \gamma_i^{(m)} = \frac{\left( \sum_{j=1}^{N} H_{i,j} \cdot P_{j,i}^{(m)} \right)}{\beta_i^{(m+1)} \cdot \left( \sum_{j=1}^{N} H_{i,j} \cdot P_{j,i}^{(m+1)} \right)}. \tag{10}$$

Indeed we will have after appropriate signal adjustment:

$$\hat{X}_i = \gamma_i^{(m+1)} \cdot \beta_i^{(m+1)} \cdot E_{i,i} \cdot \left( \sum_{j=1}^{N} H_{i,j} \cdot P_{j,i}^{(m+1)} \right) \cdot X_i = \tag{11}$$

$$\frac{\beta_i^{(m)} \cdot \left( \sum_{j=1}^{N} H_{i,j} \cdot P_{j,i}^{(m)} \right)}{\beta_i^{(m+1)} \cdot \left( \sum_{j=1}^{N} H_{i,j} \cdot P_{j,i}^{(m+1)} \right)} \cdot \gamma_i^{(m)} \cdot$$

$$\beta_i^{(m+1)} \cdot E_{i,i} \cdot \left( \sum_{j=1}^{N} H_{i,j} \cdot P_{j,i}^{(m+1)} \right) \cdot X_i \sim X_i,$$

which is the desired result.

If only the gain scaling matrix B is updated, then equation (10) reduces to:

$$\gamma_i^{(m+1)} = \frac{\beta_i^{(m)}}{\beta_i^{(m+1)}} \cdot \gamma_i^{(m)} = \frac{1}{\beta_i^{(m+1)}}. \tag{12}$$

Similarly, if the second order effects are not accounted for in equation (9), the signal compensation factors $$\gamma_i^{(m+1)}$$

are the exact inverse of the respective transmit signal scaling factors $$\beta_i^{(m+1)}$$

as per equation (12).

The VCU 130 is further configured to pass the so-determined signal compensation factors $\gamma_i$ to the transceivers 110 for communication to the respective receivers.

In a first embodiment, the VCU 130 sends the amplitude of the signal compensation factors $$\left|\gamma_i^{(m+1)}\right|$$

only (scalar value) to the transceivers 110 for communication to the respective receivers, and applies the phase of the signal compensation factors Arg $$\left(\gamma_i^{(m+1)}\right)$$

locally at the transmit side to the respective transmit frequency samples $X_i$.

In a second alternative embodiment, the VCU 130 sends both the phase and amplitude of the signal compensation factors $$\gamma_i^{(m+1)}$$

(complex value) to the transceivers 110 for communication to the respective receivers.

The VCU 130 is further configured to time-coordinate the enforcement of the intended precoder update, that is to say the pushing of the new precoding matrix $P^{(m+1)}$ and of the new signal scaling matrix $B^{(m+1)}$ into the VPU 120, with the enforcement of the signal compensation factors $$\gamma_i^{(m+1)}$$

by the respective receivers. The enforcements at the access node and at the receivers do not need to be strictly synchronous: they can be a few data symbols apart if the detection errors caused by the temporary channel bias can be corrected by some adjoined Forward Error Correction (FEC) code, such as Redd-Solomon or alike.

The VCU 130 may further check the amount of equalization bias caused by the intended precoder update at a receiver before triggering a signal adjustment procedure for that receiver. If the amount of expected channel bias is low compared to the noise level currently incurred by the receiver then no signal adjustment is required: the receiver is typically able to cope with such a small channel variation. Else, an appropriate signal adjustment is required at the receiver along with the corresponding precoder update.

As an exemplary embodiment, the VCU 130 computes the expected receive signal power at a given receiver, taking duly account of the direct and indirect channel gains, and assuming the phase bias is compensated for at the transmit side:

$$E\{|\hat{X}_i|^2\}^{(m)} = |\gamma_i^{(m)}|^2 \cdot |\beta_i^{(m)}|^2 \cdot |E_{i,i}|^2 \cdot \left|\sum_{j=i}^{N} H_{i,j} \cdot P_{j,i}^{(m)}\right|^2 \cdot \sigma_i^2 \sim \sigma_i^2. \tag{13}$$

When the precoder needs to be updated, the VCU 130 computes a ratio R between the expected receive signal power after the m+1$^{th}$ precoder update but without any gain adjustment at the receiver, and the current expected receive power:

$$R = \frac{|\gamma_i^{(m)}|^2 \cdot |\beta_i^{(m+1)}|^2 \cdot |E_{i,i}|^2 \cdot \left|\sum_{j=1}^{N} H_{i,j} \cdot P_{j,i}^{(m+1)}\right|^2 \cdot \sigma_i^2}{|\gamma_i^{(m)}|^2 \cdot |\beta_i^{(m)}|^2 \cdot |E_{i,i}|^2 \cdot \left|\sum_{j=1}^{N} H_{i,j} \cdot P_{j,i}^{(m)}\right|^2 \cdot \sigma_i^2} = \tag{14}$$

$$\frac{|\beta_i^{(m+1)}|^2 \cdot \left|\sum_{j=1}^{N} H_{i,j} \cdot P_{j,i}^{(m+1)}\right|^2}{|\beta_i^{(m)}|^2 \cdot \left|\sum_{j=1}^{N} H_{i,j} \cdot P_{j,i}^{(m)}\right|^2}.$$

The computation is performed for each and every active receiver of the vectoring group, and for each and every carrier index k: if the ratio R is greater than some noise-dependent threshold then a substantial channel equalization bias is expected to occur at the respective receiver, and thus the signal needs to be appropriately adjusted at the receiver along with the precoder update. The final decision may further depend on the number and characteristics of the so-affected carriers.

The noise-dependent threshold can be derived from the bit loading value that is used for the respective carrier, which is indicative of the noise level currently incurred by the receivers at that carrier frequency (including the configured noise margin). The VCU 130 may alternatively use noise measurement reports obtained from the remote receivers, such as Signal to Noise and Interference Ratio (SNIR) measurements.

The VCU 130 may update the precoder in two steps. The first precoder update has limited precoding gains (i.e., limited crosstalk mitigation performances), yet does not require any gain adjustment at the receivers (the ratio R is expected to remains within the allowable boundaries for most if not all the carriers). The second precoder update has full precoding gains, yet requires some gain adjustment at one or more receivers.

Also, the VCU 130 may update the precoder in gradual steps: a new gain scaling factor $$\beta_i^{(m+1)}$$

and new precoding coefficients $$\{P_{j,i}^{(m+1)}\}_j$$

are determined for a given subscriber line Li; a corresponding signal compensation $$\gamma_i^{(m+1)}$$

is sent to a remote receiver coupled to the subscriber line Li; and the enforcement of the new gain scaling factor $$\beta_i^{(m+1)}$$

and of the new precoding coefficients $$\{P_{j,i}^{(m+1)}\}_j$$

is time-coordinated with the enforcement of the signal compensation factor $$\gamma_i^{(m+1)}$$

at the remote receiver. The VCU 130 next re-iterates through this procedure for all other affected subscriber lines, and till the precoder is fully updated. This gradual column-wise precoder update allows a decoupling of the signal adjustment procedures over the respective subscriber lines of the vectoring group.

Figure 2:
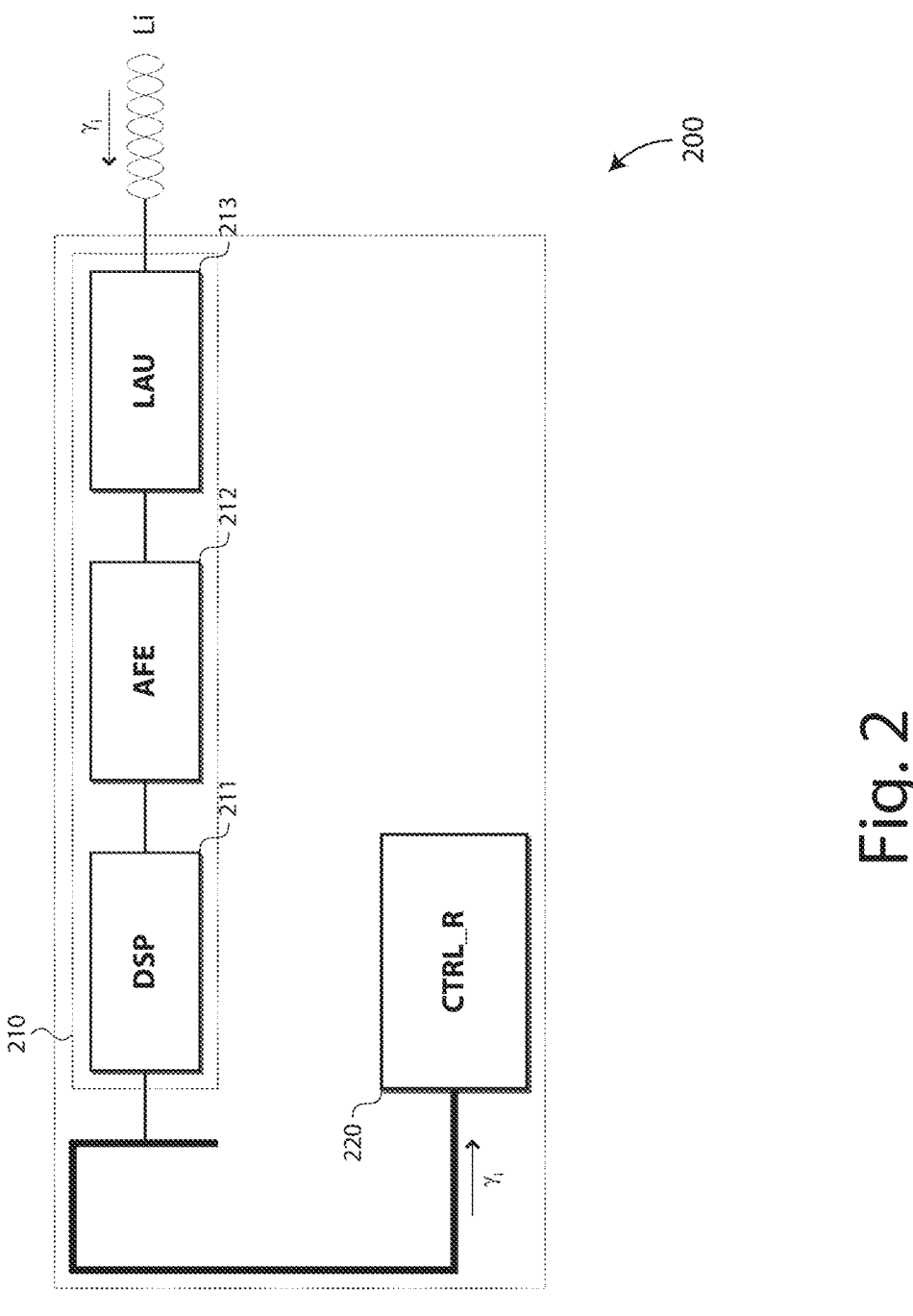
FIG. 2 represents a subscriber device as per the present invention.

There is seen in FIG. 2 a subscriber device 200 as per the present invention comprising the following functional blocks:

a transceiver 210; and a communication controller 220 (or CTRL_R) for controlling the operation of the transceiver 210.

The transceiver 210 is coupled to a subscriber line Li that forms part of a given vectoring group, and comprises the same functional blocks as aforementioned. The transceiver 210 is further coupled to the communication controller 220.

The communication controller 220 is configured to receive signal compensation factors $\gamma_i(k)$ for the respective carriers from a remote transmitter coupled to the subscriber line Li. The signal compensation factors $\gamma_i(k)$ are sent by means of high-priority control commands, such as on-Line Reconfiguration (OLR) commands as per the DSL standard. The communication controller checks the validity of the requested gain adjustment, and acknowledges the requested signal adjustment by ordering the transceiver 210 to issue an acknowledgment signal back to the transmitter, such as a SYNC flag as per the DSL standard. The signal compensation factors $\gamma_i(k)$ is passed to the transceiver 210 for enforcement from a certain data symbol index onwards after the issuance of the acknowledgment signal (e.g., the beginning of the next TDD frame following the issuance of the acknowledgment signal), or from the data symbol index that is explicitly signaled by the remote transmitter.

There is seen in FIG. 3 a message flow chart between an access node AN as per the access node 100, and N subscriber devices XTU-R1 to XTU-RN as per the subscriber device 200 coupled to respective ones of N subscriber lines L1 to LN.

In a first step 301, a particular event is detected by the access node AN that requires a precoder update, being an update of the precoding matrix P and/or an update of the signal scaling matrix B.

In a second step 302, the access node AN computes the new precoding matrix $P^{(m+1)}$ and/or the new signal scaling matrix $B^{(m+1)}$ comprising new scaling coefficients $$\beta_i^{(m+1)}.$$

In a third step 303, the access node AN checks whether the intended precoder update causes a substantial channel equalization bias that may affect one or more remote receivers XTU-Ri.

In a fourth step 304, the access node AN determines appropriate signal compensation factors $$\gamma_i^{(m+1)}$$

for the affected receivers XTU-Ri.

In a fifth step 305, the access node sends the signal compensation factors $$\gamma_i^{(m+1)}$$

to the affected receivers at once, presently xTU-R1 and xTU-R2. The signal compensation factors are sent by means of high-priority control commands (see "RX_gain_scaling( $$\gamma_i^{(m+1)}$$

)" in FIG. 3).

In a sixth step 306, the subscriber devices XTU-Ri acknowledge the correct receipt of the adjustment commands by issuing acknowledgment signals back to the access node AN (see "Ack" in FIG. 3). The subscriber devices XTU-Ri may also return adjusted bit loading values and/or adjusted fine gain tuning factors. Alternatively, the acknowledgment is implicit and no response is required.

In a seventh and last step, the new precoding matrix $P^{(m+1)}$, the new signal scaling matrix $B^{(m+1)}$ and the respective signal compensation factors $$\{\gamma_i^{(m+1)}\}_i$$

are all enforced at once over the affected subscriber lines.

There is seen in FIG. 4 an alternative embodiment wherein the access node AN performs gradual updates of the precoder.

The steps 401 to 404 are identical to the steps 301 to 304 respectively.

Then, the access node AN only deals with one particular subscriber line Li at a time. In step 405, the access node AN sends the signal compensation factor $$\gamma_i^{(m+1)}$$

to the respective receiver xTU-Ri. In step 406, the subscriber device xTU-Ri returns an acknowledgment signal to the access node AN. In step 407, the access node only updates the ith column of the precoder matrix P and the ith diagonal element of the signal scaling matrix B:

$$\{P_{j,i} = P_{j,i}^{(m+1)}\}_j$$

and $$B_{i,i} = \beta_i^{(m+1)}.$$

This update is concomitant with the enforcement of the signal compensation factor $$\gamma_i^{(m+1)}$$

at the receiver xTU-Ri. Then the access node reiterates through the steps 405 to 407 for all the other affected subscriber lines and respective receivers. This embodiment is particularly advantageous as the signal adjustments over the respective subscriber lines are fully decoupled from one another, and the precoder smoothly and gradually converges towards its final state.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A communication controller for controlling a communication over a subscriber line out of a plurality of subscriber lines, the communications over the plurality of subscriber lines making use of communication signals that are jointly processed through a linear precoder for crosstalk pre-compensation, wherein the communication controller is configured to receive signal adjustment information from a transmitter remotely coupled to the subscriber line indicative of a signal compensation factor to be applied to a receive communication signal to compensate for a channel equalization bias caused at least by a corresponding transmit signal scaling to be applied at the transmitter to scale down a transmit communication signal for conformance to a transmit Power Spectral Density (PSD) mask after joint processing of the communication signals through an updated linear precoder, the updated linear precoder being the linear precoder after a linear precoder update, and the communication controller is configured to
send adjusted bit loading values in response to receiving the signal adjustment information,
time-coordinate an enforcement of the signal compensation factor with the corresponding transmit signal scaling and the linear precoder update from a data symbol index received from the transmitter, and
compensate for the channel equalization bias resulting from the linear precoder update based on the enforcement of the signal compensation factor with the corresponding transmit signal scaling and the linear precoder update.

2. A subscriber device comprising:
the communication controller according to claim 1.

3. A method for controlling communications over a plurality of subscriber lines, the communications making use of communication signals that are jointly processed through a linear precoder for crosstalk pre-compensation, the method comprising:
updating one or more coupling coefficients of the linear precoder for mitigating crosstalk from a subscriber line into one or more victim lines, sending signal adjustment information to a receiver remotely coupled to the subscriber line indicative of a signal compensation factor to be applied to a receive communication signal to compensate for a channel equalization bias caused by crosstalk pre-compensation signals superimposed over the one or more victim lines and corresponding to the respective one or more updated coupling coefficients of the linear precoder after joint processing of the communication signals through an updated precoder, the updated precoder being the linear precoder after a precoder update; and time-coordinating the precoder update with an enforcement of the signal compensation factor at the receiver, and the sending the signal adjustment information to the receiver being in response to a determination that the precoder update results in the channel equalization bias at the receiver.

4. The method according to claim 3, wherein the signal compensation factor is a real factor that compensates for an amplitude equalization bias.

5. The method according to claim 3, wherein the signal compensation factor is a complex factor that compensates for both an amplitude equalization bias and a phase equalization bias.

6. The method according to claim 3, wherein the linear precoder is updated in two steps, a first precoder update with partial precoding gains and limited channel equalization bias, and a second precoder update with full precoding gains, and wherein the sending step takes place between the first and second precoder updates, and the second precoder update is time-coordinated with the enforcement of the signal compensation factor at the receiver.

7. The method according to claim 3, wherein the method further comprises:

a step of, upon receipt of gain adjustment information, returning an adapted bit loading value and/or an adapted fine gain tuning factor for a respective carrier to a corresponding transmitter.

8. The method according to claim 3, wherein the communication signals are multi-carrier signals, and wherein gain adjustment information and the corresponding signal compensation factor are determined on a per carrier basis.

9. A communication controller for controlling communications over a plurality of subscriber lines, the communications making use of communication signals that are jointly processed through a linear precoder for crosstalk pre-compensation, the communication controller comprising:

at least one processor; and at least at least one memory including computer program code, the at least one memory and the computer program code configured to, with the at least one processor, cause the communication controller to update one or more coupling coefficients of the linear precoder for mitigating crosstalk from a subscriber line into one or more victim lines, to send signal adjustment information to a receiver remotely coupled to the subscriber line indicative of a signal compensation factor to be applied to a receive communication signal to compensate for a channel equalization bias caused by crosstalk pre-compensation signals superimposed over the one or more victim lines and corresponding to the respective one or more updated coupling coefficients of the linear precoder, after joint processing of the communication signals through an updated precoder, the updated precoder being the linear precoder after a precoder update, and to time-coordinate the precoder update with an enforcement of the signal compensation factor at the receiver, and the sending the signal adjustment information to the receiver being in response to a determination that the precoder update results in the channel equalization bias at the receiver.

10. An access node comprising the communication controller according to claim 9.

11. A communication controller for controlling a communication over a subscriber line out of a plurality of subscriber lines, the communications over the plurality of subscriber lines making use of communication signals that are jointly processed through a linear precoder for crosstalk pre-compensation, the communication controller comprising:

at least one processor; and at least one memory including computer program code, the at least one memory and the computer program code configured to, with the at least one processor, cause the communication controller to receive signal adjustment information from a transmitter remotely coupled to the subscriber line indicative of a signal compensation factor to be applied to a receive communication signal to compensate for a channel equalization bias caused by crosstalk pre-compensation signals superimposed over one or more victim lines and corresponding to respective one or more updated coupling coefficients of the linear precoder after joint processing of the communication signals through an updated precoder, the updated precoder being the linear precoder after a precoder update, send adjusted bit loading values in response to receiving the signal adjustment information, time-coordinate an enforcement of the signal compensation factor with a corresponding transmit signal scaling and the linear precoder update from a data symbol index received from the transmitter, and compensate for the channel equalization bias resulting from the linear precoder update based on enforcing the signal compensation factor with the corresponding transmit signal scaling and the linear precoder update.

12. A subscriber device comprising:

the communication controller according to claim 11.

13. A communication controller for controlling a communication over a subscriber line out of a plurality of subscriber lines, the communications over the plurality of subscriber lines making use of communication signals that are jointly processed through a linear precoder for crosstalk pre-compensation, wherein the communication controller is configured to receive signal adjustment information from a transmitter remotely coupled to the subscriber line indicative of a signal compensation factor to be applied to a receive communication signal to compensate for a channel equalization bias caused at least by a corresponding transmit signal scaling to be applied at the transmitter to scale down a transmit communication signal for conformance to a transmit Power Spectral Density (PSD) mask after joint processing of the communication signals through an updated linear precoder, the updated linear precoder being the linear precoder after a linear precoder update, and the communication controller is configured to time-coordinate an enforcement of the signal compensation factor with the corresponding transmit signal scaling and the linear precoder update, and compensate for the channel equalization bias resulting from the linear precoder updated based on the enforcement of the signal compensation factor with the corresponding transmit signal scaling and the linear precoder update, wherein the communication controller is configured to time-coordinate the enforcement of the signal compensation factor with the corresponding transmit signal scaling and the linear precoder update by sending an acknowledgment signal to the transmitter.

14. The communication controller of claim 13, wherein the communication controller is configured to time-coordinate the enforcement of the signal compensation factor with the corresponding transmit signal scaling and the linear precoder update from a data symbol index onwards after sending the acknowledgment signal, or the communication controller is configured to time-coordinate the enforcement of the signal compensation factor with the corresponding transmit signal scaling and the linear precoder update from a data symbol index received from the transmitter.

15. The method of claim 3, wherein the time-coordinating of the precoder update with the enforcement of the signal compensation factor at the receiver is based on a received acknowledgment signal.

16. The method of claim 15, wherein the time-coordinating of the precoder update with the enforcement of the signal compensation factor at the receiver is from a data symbol index onwards after the received acknowledgment signal, or the time-coordinating of the precoder update with the enforcement of the signal compensation factor at the receiver is from a data symbol index sent to the receiver.

17. The communication controller of claim 9, wherein the communication controller is configured to time-coordinate the precoder update with the enforcement of the signal compensation factor at the receiver based on an acknowledgment signal.

18. The communication controller of claim 17, wherein the communication controller is configured to time-coordinate the precoder update with the enforcement of the signal compensation factor at the receiver from a data symbol index onwards after receiving the acknowledgment signal, or the communication controller is configured to time-coordinate the precoder update with the enforcement of the signal compensation factor at the receiver from a data symbol index sent to the receiver.

19. The communication controller of claim 11, wherein the communication controller is configured to enforce the signal compensation factor from the data symbol index onwards after sending an acknowledgement signal.

* * * * *